(12) United States Patent
Sato et al.

(10) Patent No.: US 8,672,593 B2
(45) Date of Patent: Mar. 18, 2014

(54) METHOD AND APPARATUS FOR COOLING MOBILE BODY OF MACHINE TOOL

(75) Inventors: Hideshi Sato, Kanagawa (JP); Kazumasa Nakayasu, Kanagawa (JP); Hidehiko Akasaka, Kanagawa (JP)

(73) Assignee: Makino Milling Machine Co., Ltd, Tokyo (JP)

( * ) Notice: Subject to any disclaimer, the term of this patent is extended or adjusted under 35 U.S.C. 154(b) by 1050 days.

(21) Appl. No.: 12/676,243

(22) PCT Filed: Sep. 1, 2008

(86) PCT No.: PCT/JP2008/066135
§ 371 (c)(1),
(2), (4) Date: Mar. 3, 2010

(87) PCT Pub. No.: WO2009/031672
PCT Pub. Date: Mar. 12, 2009

(65) Prior Publication Data
US 2010/0183393 A1    Jul. 22, 2010

(30) Foreign Application Priority Data
Sep. 7, 2007  (JP) ................................. 2007-233170

(51) Int. Cl.
*B23Q 15/18*    (2006.01)
*B23Q 11/12*    (2006.01)

(52) U.S. Cl.
USPC ........................... 409/131; 409/135; 409/238

(58) Field of Classification Search
USPC ............................... 409/135–36, 238–39, 131
IPC ............................................. B23Q 11/12,15/18
See application file for complete search history.

(56) References Cited

U.S. PATENT DOCUMENTS

| | | | | |
|---|---|---|---|---|
| 3,221,606 A | * | 12/1965 | Baldwin | 409/135 |
| 3,555,962 A | * | 1/1971 | Wolf et al. | 409/231 |
| 4,602,874 A | * | 7/1986 | Neugebauer | 384/476 |
| 5,192,139 A | * | 3/1993 | Hiramoto et al. | 384/476 |
| 5,798,587 A | * | 8/1998 | Lee | 310/58 |
| 6,089,797 A | * | 7/2000 | Chen et al. | 408/8 |
| 6,293,703 B1 | * | 9/2001 | Date | 384/476 |

(Continued)

FOREIGN PATENT DOCUMENTS

| | | |
|---|---|---|
| CN | 1517176 A | 8/2004 |
| CN | 1915590 A | 2/2007 |

(Continued)

*Primary Examiner* — Daniel Howell
*Assistant Examiner* — Michael Vitale
(74) *Attorney, Agent, or Firm* — Paul & Paul

(57) ABSTRACT

A cooling method and cooling apparatus which can reduce thermal deformation of a mobile body of a machine tool is provided. On the front of a column (1), a pair of upper and lower guides (3) is formed, and saddle (7) is suspended on guides (3), saddle (7) being movable left and right. Guiding surface (5) of guide (3) and sliding surface (9) of saddle (7) are slip surface and are in contact with each other. Sliding surfaces (9a, 9b, 9d, 9e) which generate a large amount of heat and need to be cooled are identified in advance by simulation. Fluid pipelines (25) for cooling the identified portions generating higher heat are formed, and a coolant liquid is circulated by being passed from portion (9a) generating less heat toward portion (9e) generating higher heat.

4 Claims, 2 Drawing Sheets

(56) References Cited

U.S. PATENT DOCUMENTS

| | | | |
|---|---|---|---|
| 6,373,158 B1* | 4/2002 | Hsu et al. | 310/90 |
| 6,425,715 B1* | 7/2002 | Sasanecki | 408/56 |
| 6,675,549 B1* | 1/2004 | Kaneda et al. | 52/749.1 |
| 6,913,390 B2* | 7/2005 | Inoue et al. | 384/476 |
| 6,923,603 B2* | 8/2005 | Muto | 409/135 |
| 7,134,812 B2* | 11/2006 | Beckington | 408/56 |
| 7,160,063 B2* | 1/2007 | Wood et al. | 408/61 |
| 7,509,719 B2* | 3/2009 | Neumeier | 29/40 |
| 2002/0034427 A1* | 3/2002 | Senzaki | 409/136 |
| 2002/0085892 A1* | 7/2002 | Hara | 409/135 |
| 2002/0146297 A1* | 10/2002 | Curtis | 409/132 |
| 2003/0103825 A1* | 6/2003 | Muto | 409/135 |
| 2003/0133766 A1* | 7/2003 | Makiyama | 409/136 |
| 2004/0013335 A1* | 1/2004 | Inoue et al. | 384/476 |
| 2005/0241880 A1* | 11/2005 | Nawamoto et al. | 184/6 |
| 2006/0029481 A1* | 2/2006 | Craig et al. | 409/136 |
| 2007/0177953 A1* | 8/2007 | Matsumura et al. | 409/136 |

FOREIGN PATENT DOCUMENTS

| | | | | |
|---|---|---|---|---|
| EP | 0355730 A2 | | 2/1990 | |
| EP | 1629940 A2 | | 3/2006 | |
| EP | 1685925 B1 | | 8/2006 | |
| JP | 57083341 A | * | 5/1982 | |
| JP | 01092047 A | * | 4/1989 | |
| JP | 04093148 A | * | 3/1992 | |
| JP | 05023936 A | * | 2/1993 | |
| JP | 05092343 | | 4/1993 | |
| JP | 05092343 A | * | 4/1993 | |
| JP | 05309536 A | * | 11/1993 | B23Q 11/12 |
| JP | 2000042864 A | * | 2/2000 | B23Q 11/12 |
| JP | 2000117571 A | * | 4/2000 | |
| JP | 2002059338 A | | 2/2002 | |
| JP | 2002103102 A | | 4/2002 | |
| JP | 2002166337 A | | 6/2002 | |
| JP | 2003145373 A | * | 5/2003 | B23Q 11/12 |
| JP | 2005230955 A | * | 9/2005 | |
| JP | 2007038329 A | * | 2/2007 | |

* cited by examiner

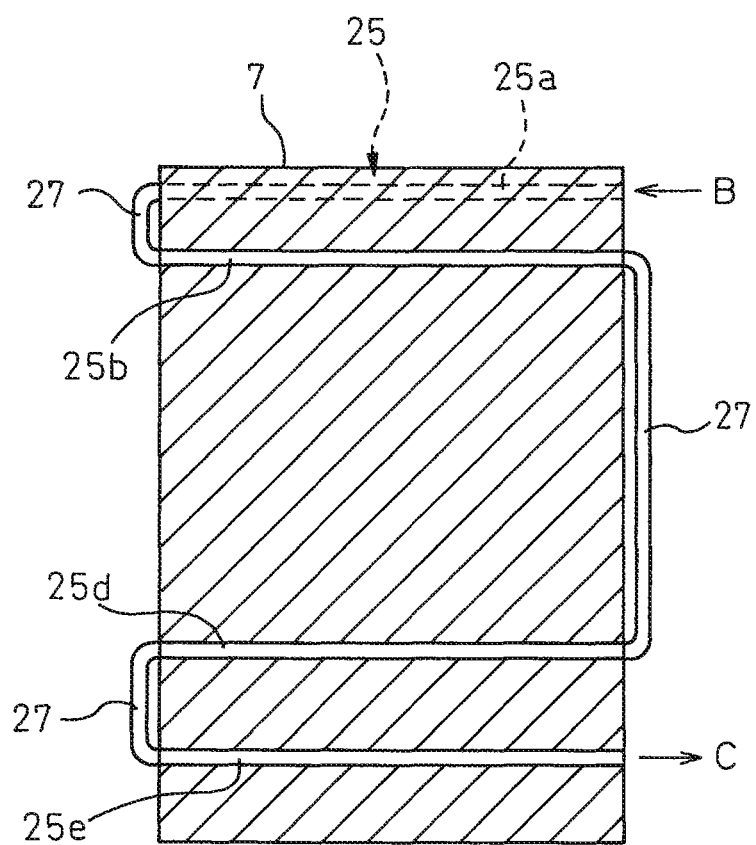

METHOD AND APPARATUS FOR COOLING MOBILE BODY OF MACHINE TOOL

FIELD OF THE INVENTION

The present invention relates to a method and apparatus for cooling heat generating portions of a mobile body of a machine tool so as to minimize a change in thermal deformation of the mobile body.

BACKGROUND ART

In order to improve the processing efficiency of a machine tool, the machine tool is required to be able to feed its mobile body such as a table, a saddle or the like at high speed. In the case where the machine tool is constructed to include sliding surfaces on the mobile body, when the mobile body is fed at high speed, frictional heat is generated by the friction of the sliding surfaces. Therefore, a problem arises that, when the frictional heat is transferred to various parts, thermal deformation of the mobile body occurs, the processing precision of the machine tool is degraded.

A method for removing the heat generated by the friction of sliding surfaces of a bed or a saddle of a machine tool has been disclosed in Japanese Patent Publication No. 2000-117571. In this method, pipelines are provided in the rib of the bed sliding surface or under the saddle sliding surface, and a coolant liquid is circulated through the pipelines so as to suppress a temperature rise in the bed sliding surfaces or the saddle sliding surfaces.

Further, a method for supplying a coolant liquid in order to cool various portions of a machine tool while adjusting the flow rate of the coolant liquid in response to the amount of heat generated in various portions to obtain uniform temperature at various portions of the machine tool is disclosed in Japanese Patent Publication No. 2002-166337. In this method, a pipeline for supplying the coolant liquid is provided on each heat generating portion of the machine tool and a valve for adjusting the flow rate of the coolant liquid is provided in each pipeline so that the flow rate of the coolant liquid can be adjusted in response to the amount of heat generated at each portion of the machine tool so as to suppress temperature fluctuation in various portions of the machine.

The cooling device of a machine tool as disclosed in the above-described Japanese Patent Publication No. 2000-117571 and Japanese Patent Publication No. 2002-166337 has temperature sensors embedded in various portions of the machine in order to detect temperature in various portions of the machine or temperature differences between various portions of the machine. Thus, the temperature or flow rate of the coolant is adjusted in response to the detected temperature of various portions, and the coolant liquid is circulated so that heat generated in various portions of the machine can be reduced and temperature fluctuation in various portions of the machine can be suppressed. Therefore, there is a problem that a large number of sensors and flow rate adjusting means are required which results in an expensive machine.

DISCLOSURE OF THE INVENTION

The present invention has been conceived in order to resolve the above-described problem, and thus, it is an object of the present invention to provide a method and apparatus for cooling a mobile body of a machine tool that is capable of predicting heat generation of the mobile body of the machine tool, identifying portions to be cooled, and passing a coolant liquid to the identified portions to be cooled so as to reduce thermal deformation of the mobile body.

In order to attain the above object, in accordance with the present invention, there is provided a method for cooling a mobile body of a machine tool, the method comprising: (a) predicting heat generation of various portions of the mobile body at the time of operation of the machine tool, and identifying plural portions to be cooled which generate a large amount of heat and need to be cooled, (b) forming fluid pipelines for passing a coolant liquid to the identified portions to be cooled, and (c) supplying the coolant cooled to a specified temperature to the fluid pipelines and circulating the coolant liquid by passing it through portions to be cooled from a portion generating less heat toward a portion generating higher heat.

Also, in order to attain the above object, in accordance with the present invention, there is provided a method for cooling a mobile body of a machine tool, the method comprising: (a) simulating an amount of heat generated in various portions or temperature distribution of the mobile body based on design data at the time of operation of the machine tool, and identifying plural portions to be cooled which generate a large amount of heat and need to be cooled, in a design stage of the machine tool, (b) forming fluid pipelines in the mobile body such that a coolant liquid can pass through the identified portions to be cooled or vicinity thereof in succession, in a manufacturing stage of the machine tool, and (c) supplying the coolant liquid that has been cooled to a specified temperature to the fluid pipelines, and circulating the coolant liquid by passing it through the identified portions to be cooled from a portion generating less heat toward a portion generating higher heat, in an operation stage of the machine tool.

The "an operation stage of the machine tool" refers to the stage in which the machine tool is used to process a work piece.

Also, in order to attain the above object, in accordance with the present invention, there is provided a cooling apparatus of a mobile body of a machine tool for implementing the cooling method for cooling the mobile body of the machine tool, comprising fluid pipelines for passing a coolant liquid to the identified portions to be cooled or the vicinity thereof of the mobile body of the machine tool, the fluid pipelines being formed so as to pass a coolant liquid through the identified portions to be cooled or a vicinity thereof successively, and coolant liquid circulating means for supplying the coolant liquid that has been cooled to a specified temperature to the fluid pipelines, and circulating the coolant liquid.

When a mobile body of a machine tool is elongated or shortened in a short time period due to heat generation of various portions, and if the change of thermal deformation is large, processing precision of a work piece is adversely affected. However, even if various portions of a mobile body are not at the same temperature, if the temperature between various portions of a mobile body is constant and stable, thermal deformation remains small and adverse effect on processing precision remains small. The present invention takes into account this, and attempts, by accepting temperature difference between various portions of a mobile body to some extent but minimizing the change of temperature difference between various portions of a mobile body, thereby suppressing an adverse effect on the processing precision of a work piece processed.

As has been described above, in accordance with the present invention, portions to be cooled in a mobile body of a machine tool are identified in advance, fluid pipelines are provided so as to pass a coolant liquid to the identified portions to be cooled, and the coolant liquid is circulated by passing the coolant liquid from a portion generating less heat toward a portion generating higher heat so as to cool the portions generating heat. Therefore, although the temperature in various portions is not perfectly equal, thermal deformation of the mobile body remains small since the change of temperature difference between various portions is small. Thus, there is little thermal deformation of the mobile body while a work piece is being processed, and processing precision of the work piece is stable.

Also, in accordance with the present invention, not all portions generating heat are cooled, but portions which generate a large amount of heat and need to be cooled are identified and cooled. Thus, the path of fluid pipelines can be simplified and shortened, so that the amount of supplied coolant liquid may be reduced and the entire apparatus may be simplified and thus be cheaper.

BRIEF DESCRIPTION OF DRAWINGS

The above and other objects, features, and advantages of the present invention will be described in more detail below with reference to the drawings based on an embodiment thereof, in which:

FIG. 2 is a front sectional view taken along the line A-A of the mobile body shown in FIG. 1.

BEST MODE FOR CARRYING OUT THE INVENTION

Figure 1:
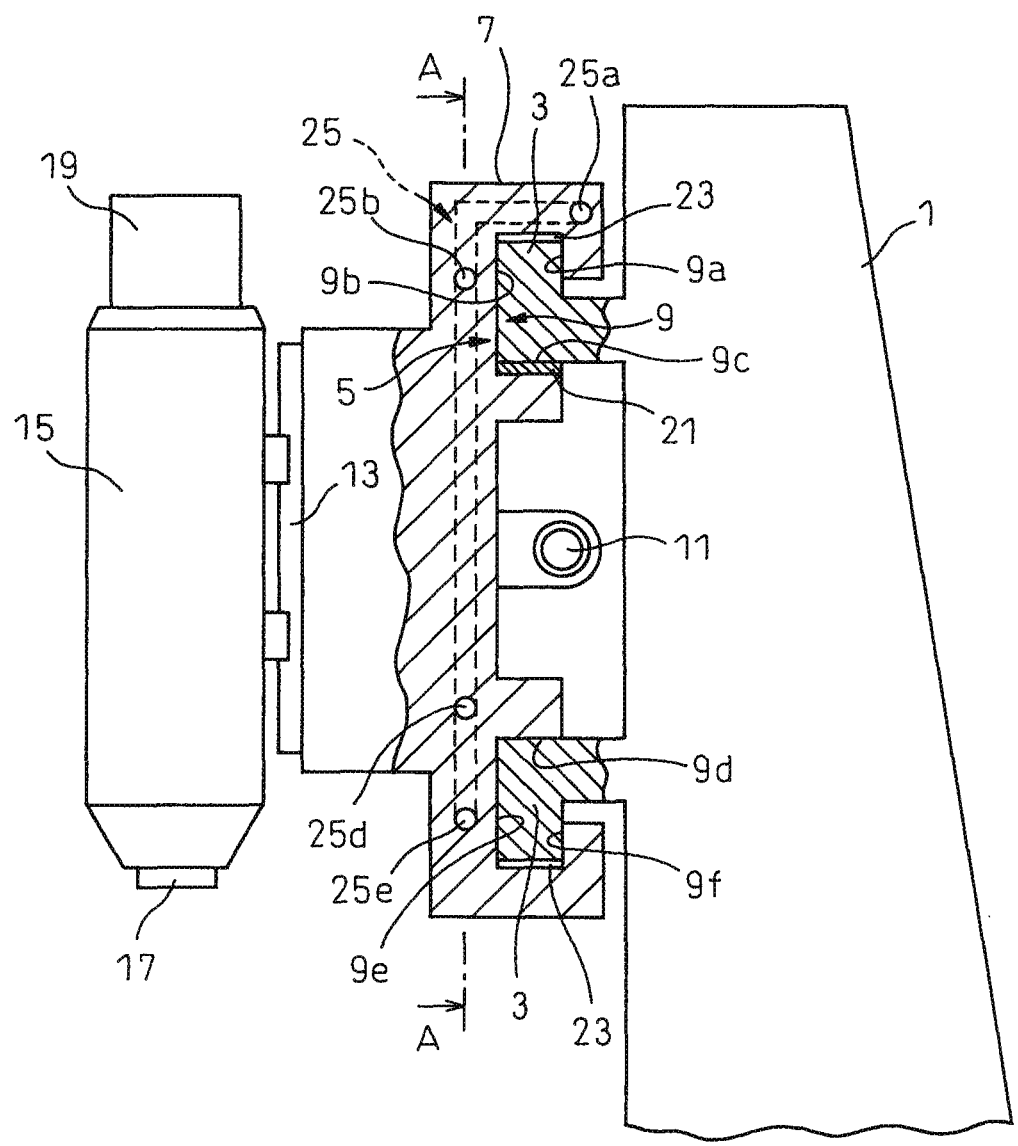
FIG. 1 is a side view showing a cooling apparatus of a mobile body of a machine tool according to an embodiment of the present invention.

The cooling method and apparatus for cooling a mobile body of a machine tool according to the present invention will be described with reference to drawings showing an embodiment thereof. FIG. 1 is a side view showing a cooling apparatus of a mobile body of a machine tool according to an embodiment of the present invention. The machine tool shown in FIG. 1 is a vertical type machining center having column 1 erected vertically on a bed (not shown). A pair of upper and lower guides 3 is provided on the front of column 1, where guides 3 are provided parallel to a direction perpendicular to the plane of paper. Guides 3 are angle-shaped guides having plural guiding surfaces 5. Saddle 7 is suspended on guides 3 with sliding surfaces 9 engaged with guiding surfaces 5. Saddle 7 is movable on guides 3 by means of a driving device (not shown) and feed screw 11. Linear guide 13 is provided on saddle 7 such that spindle head 15 can move up and down vertically. Tool spindle 17 for mounting a cutting tool is supported inside spindle head 15 so as to be driven by motor 19.

Surface pressure between guiding surface 5 of guide 3 and sliding surface 9 of saddle 7 are adjusted so as to have no gap between guiding surface 5 and sliding surface 9. Gib 21 is provided between saddle 7 and guide 3 so as to permit sliding surface pressure to be adjusted. Gap 23 is provided on the lower and upper surfaces of guide 3. Sliding surface 9 of saddle 7 includes sliding surfaces 9a, 9b, 9c, 9d, 9e, 9f which are respectively in contact with respective guiding surfaces 5 of guide 3. When saddle 7 is moved, heat is generated by the friction of the sliding surfaces, and as a result the temperature in various portions of the mobile body rises. In the construction as shown in FIG. 1, where saddle 7 is suspended on a pair of upper and lower guides 3, wherein the sliding surface pressure of respective sliding surfaces 9a-9f of saddle 7 varies due to mass and moment loads or pressing force of the mobile body, the amount of heat generation is different between various portions of the mobile body.

In accordance with the present invention, in order to increase the cooling effect efficiently with a small amount of cooling energy, the amount of heat generation for various portions of the mobile body or the temperature distribution of the mobile body of the machine tool is simulated in advance, and plural portions which generate a large amount of heat and need to be cooled are identified and only those identified portions which need to be cooled are cooled. The simulation is carried out in the design stage of the machine tool based on design data such as the dimension, mass, moment loads and surface pressures of various machine elements, and the heat generation of various portions is analyzed to identify plural portions to be cooled which generate a large amount of heat and need to be cooled. The simulation can be performed by using a structure analysis tool, for example, COSMOWORKS™ (trade name).

An example of simulation in the case of the embodiment shown in FIG. 1 will be explained below. As a result of analysis of heat generation by using a structure analysis tool, the portions generating higher heat were identified in descending order as $9e$, $9d$, $9a$, $9b$, $9c$, $9f$. Therefore, portions $9a$, $9b$, $9d$, $9e$ were been identified as portions which need to be cooled and it was decided that portions $9c$ and $9f$ are not cooled. In the manufacturing stage of the machine tool, fluid pipelines 25 are provided so as to pass a coolant liquid to the identified portions to be cooled or the vicinity thereof of saddle 7 (mobile body). Fluid pipelines 25 include pipeline $25a$ formed near sliding surface $9a$, pipeline $25b$ formed near sliding surface $9b$, pipeline $25d$ formed near sliding surface $9d$, and pipeline $25e$ formed near sliding surface $9e$. FIG. 2 is a front sectional view taken along line A-A of the mobile body shown in FIG. 1. In FIG. 2, pipelines $25a$, $25b$, $25d$, and $25e$ are connected by pipe member 27. Thus, pipelines $25a$, $25b$, $25d$, and $25e$ collectively form one interconnected pipeline 25.

As a result of the simulation described above, it was found that the amount of heat generation is greatest for the portion of sliding surface $9e$, and smallest for the portion of sliding surface $9a$ than for the portion of sliding surface $9e$. Therefore, in accordance with the present invention, a coolant liquid is passed from the portion of sliding surface $9a$ toward the portion of sliding surface $9e$. That is, the coolant liquid is circulated by supplying it from arrow B and recovering it at arrow C, and by circulating the coolant liquid cooled to a specified temperature in this manner, the temperature of the portion of sliding surface $9e$ is maintained at a somewhat higher temperature than the temperature of the portion of sliding surface $9a$. Therefore, a change in the temperature difference between various portions is small, so that thermal deformation of the mobile body is kept small and processing precision of a work piece is not adversely affected.

As has been described above, the present invention attempts not to suppress thermal deformation of a mobile body of a machine tool by equalizing temperature of various portions, but to suppress change of thermal deformation of a mobile body by reducing change of temperature difference between various portions. In contrast, the prior art methods described before attempted to suppress thermal deformation of a mobile body by equalizing the temperature of various portions of a machine. Thus, the technical idea of the present invention, i.e., temperature differences between various portions may be accepted to some extent but temperature difference between various portions should be small in order to reduce thermal deformation, which could not be conceived from the viewpoint of prior art.

The invention claimed is:

1. A cooling method for cooling a mobile body of a machine tool, wherein the mobile body of the machine tool has sliding portions of greater amount of heat generation and sliding portions of lesser amount of heat generation, characterized in that said method comprises:
   (a) predicting heat generation in various sliding portions of said mobile body when operating said machine tool, and identifying plural sliding portions to be cooled which generate a greater amount of heat and need to be cooled;
   (b) forming fluid pipelines for passing a coolant liquid through a vicinity of said identified portions; and
   (c) supplying said coolant liquid cooled to a specified temperature into said fluid pipelines and circulating said coolant liquid in said identified plural sliding portions to be cooled by passing said coolant liquid from the sliding portions of lesser amount of heat generation toward the sliding portions of greater amount of heat generation.

2. A cooling apparatus for implementing said cooling method of a mobile body of a machine tool as claimed in claim 1,
   characterized in that said apparatus comprises:
   fluid pipelines provided in said mobile body of said machine tool for passing a coolant liquid through a vicinity of said identified sliding portions to be cooled, said fluid pipelines being formed in interconnected manner such that said coolant liquid flows through said vicinity of said identified plural sliding portions to be cooled successively; and
   coolant liquid circulating means provided for supplying said coolant liquid cooled to a specified temperature into said fluid pipelines and circulating said coolant liquid through said fluid pipelines.

3. A cooling method for cooling a mobile body of a machine tool, wherein the mobile body of the machine tool has sliding portions of greater amount of heat generation and sliding portions of lesser amount of heat generation, characterized in that said method comprises:
   (a) simulating an amount of heat generation of various sliding portions of said mobile body or temperature distribution of sliding portions of said mobile body based on design data when operating said machine tool, and identifying plural sliding portions to be cooled which generate a greater amount of heat and need to be cooled, in a design stage of said machine tool;
   (b) forming fluid pipelines in said mobile body such that a coolant liquid flows through a vicinity of said identified sliding portions to be cooled successively, in a manufacture stage of said machine tool; and
   (c) supplying said coolant liquid cooled to a specified temperature into said fluid pipelines and circulating said coolant liquid in said identified sliding portions to be cooled by passing said coolant liquid from a portion of lesser amount of heat generation toward a portion of greater amount of heat generation, in an operation stage of said machine tool.

4. A cooling apparatus for implementing the cooling method of a mobile body of a machine tool as claimed in claim 3, characterized in that said apparatus comprises:
   fluid pipelines provided in said mobile body of said machine tool for passing a coolant liquid through a vicinity of said identified sliding portions to be cooled, said fluid pipelines being formed in interconnected manner such that said coolant liquid flows through said vicinity of said identified plural sliding portions to be cooled successively; and
   coolant liquid circulating means provided for supplying said coolant liquid cooled to a specified temperature into said fluid pipelines and circulating said coolant liquid through said fluid pipelines.

\* \* \* \* \*